US011454566B2

(12) United States Patent
Sun et al.

(10) Patent No.: US 11,454,566 B2
(45) Date of Patent: Sep. 27, 2022

(54) PARAMETER SIMILARITY METHOD FOR TEST SIMULATION CONDITIONS OF AERODYNAMIC HEATING ENVIRONMENT

(71) Applicant: DALIAN UNIVERSITY OF TECHNOLOGY, Liaoning (CN)

(72) Inventors: Dechuan Sun, Liaoning (CN); Ming Lu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 397 days.

(21) Appl. No.: 16/647,432

(22) PCT Filed: Mar. 21, 2019

(86) PCT No.: PCT/CN2019/078986
§ 371 (c)(1),
(2) Date: Mar. 13, 2020

(87) PCT Pub. No.: WO2020/015375
PCT Pub. Date: Jan. 23, 2020

(65) Prior Publication Data
US 2020/0217749 A1 Jul. 9, 2020

(30) Foreign Application Priority Data

Jul. 18, 2018 (CN) .......................... 201810789945.4

(51) Int. Cl.
*G01M 9/06* (2006.01)
*G01M 9/02* (2006.01)
*G01N 25/18* (2006.01)
(52) U.S. Cl.
CPC .............. *G01M 9/065* (2013.01); *G01M 9/02* (2013.01); *G01N 25/18* (2013.01)
(58) Field of Classification Search
None
See application file for complete search history.

(56) References Cited

U.S. PATENT DOCUMENTS

| 5,585,557 | A | | 12/1996 | Loschke et al. | |
| 5,942,682 | A | * | 8/1999 | Ghetzler | G01M 9/06 |
| | | | | | 73/147 |
| 10,533,923 | B2 | * | 1/2020 | Birch | G01M 9/04 |
| 10,605,279 | B2 | * | 3/2020 | Kremeyer | F15D 1/008 |
| 2017/0316133 | A1 | * | 11/2017 | Abramov | G06F 30/17 |

FOREIGN PATENT DOCUMENTS

| CN | 104267062 A | | 1/2015 | |
| CN | 104820748 A | | 8/2015 | |
| CN | 105548250 A | * | 5/2016 | ............. G01N 25/20 |
| CN | 106844820 A | | 6/2017 | |
| CN | 107808065 A | | 3/2018 | |
| CN | 109029907 A | | 12/2018 | |

* cited by examiner

*Primary Examiner* — Peter J Macchiarolo
*Assistant Examiner* — Jermaine L Jenkins
(74) *Attorney, Agent, or Firm* — Muncy, Geissler, Olds & Lowe, P.C.

(57) ABSTRACT

A parameter similarity method for test simulation conditions of an aerodynamic heating environment is disclosed. With respect to the requirement that the adiabatic wall enthalpy and the cold-wall heat flux are equal in the simulation test of the aerodynamic heating environment, a method that can ensure the similarity of ground test parameters and flight parameters without the equal adiabatic wall enthalpy is proposed, and solves the problems of relying on the equal adiabatic wall enthalpy and making it difficult to accurately simulate the real aerodynamic heating environment in the current test simulation method, and provides guarantee for heat transfer and ablation test research of thermal protection/insulation material under the high temperature aerodynamic heating environment. The test conditions are not affected by the value of the adiabatic wall enthalpy. According to the method, most test devices can simulate the aerodynamic heating environment with high enthalpy.

1 Claim, No Drawings

US 11,454,566 B2

PARAMETER SIMILARITY METHOD FOR TEST SIMULATION CONDITIONS OF AERODYNAMIC HEATING ENVIRONMENT

TECHNICAL FIELD

The present invention belongs to the technical field of aeronautics and astronautics, relates to a test simulation method for an aerodynamic heating environment of thermal protection/insulation material, and particularly relates to a parameter similarity method for simulation test conditions of a high temperature aerodynamic heating environment when it is difficult to ensure that both adiabatic wall enthalpy and cold-wall heat flux are equal to those of flight respectively.

BACKGROUND

The flight vehicle will face an extremely severe aerodynamic heating environment during supersonic flight and hypersonic flight, and will be affected by strong aerodynamic heating and aerodynamic force. In order to study the working state of an external thermal protection structure of the flight vehicle under the complex aerodynamic heating environment, a ground test is needed to simulate the real aerodynamic heating environment in which the flight vehicle is located, and the performance indicators of the material of the thermal protection structure are assessed to ensure the safe and reliable operation of the flight vehicle. When the ground test is used to simulate the real flight condition, it is a basic principle to ensure that the ground test parameters are similar to the flight condition parameters.

Ground test facilities for simulating the aerodynamic heating environment of flight mainly include arc-heated wind tunnels, combustion-gas devices, oxyacetylene ablation testing equipment and thermal radiation devices. Common test simulation similarity parameters mainly include adiabatic wall enthalpy, cold-wall heat flux and surface temperature.

In these ground simulation test equipments, the arc-heated wind tunnel has test parameters closest to the flight condition. The arc-heated wind tunnel can simultaneously simulate parameters of the airflow adiabatic wall enthalpy, the cold-wall heat flux and reference pressure in the flight condition, and is the most reliable method in the current simulation test for the aerodynamic heating environment. However, the premise of accurately simulating the flight condition parameters by the arc-heated wind tunnel is to ensure that both adiabatic wall enthalpy and cold-wall heat flux are equal to those of flight respectively. For the arc-heated wind tunnel, the simulation parameters also have a certain range, and it is impossible to meet the requirements of all flight heating environment simulations through a set of equipment. In addition, the arc-heated wind tunnel test has very high cost, long test cycle and short single operation time, which is not conducive to the study of the external thermal protection structures.

Other gas flow test devices and oxyacetylene ablation test machines heat test pieces by burning the gas at high temperature to simulate the heating environment of flight. For example, for a combustion wind tunnel, the gas flow adiabatic wall enthalpy is limited by the total temperature of combustion, and generally does not exceed 4000 kJ/kg. Thus, the flight condition when the adiabatic wall enthalpy is less than 4000 kJ/kg can only be simulated. It is also necessary to ensure that the adiabatic wall enthalpy and the cold-wall heat flux are equal to the parameters of the flight condition during the test. For such test simulation devices as the oxyacetylene ablation test devices, the cold-wall heat flux is only used as the similarity parameter, that is, in the ground test, the cold-wall heat flux of gas for the test piece is ensured to be equal to the cold-wall heat flux under the flight condition. The parameter similarity method only considers the cold-wall heat flux and ignores the effects of parameters such as the adiabatic wall enthalpy, and thus has a large deviation from the flight condition.

The device for ground simulation of the aerodynamic heating environment using heat radiation mainly heats the wall surface of a structural component by radiative heat flux generated by a bank of quartz lamps. In this way, the radiative heat flux is used to represent the cold-wall heat flux, and the surface temperature is used as a reference value to measure whether the test requirements are met.

To sum up, the current ground test devices for simulation of the hypersonic aerodynamic heating environment generally use two parameters of the cold-wall heat flux and the adiabatic wall enthalpy as the similarity parameters. For the adiabatic wall enthalpy value higher than 4000 kJ/kg, the simulation test can only be performed through the arc-heated wind tunnel, but the test has high cost. For the adiabatic wall enthalpy value lower than 4000 kJ/kg, the combustion wind tunnel can be used for conducting the simulation test. Other test devices only simulate the cold-wall heat flux without considering the effect of the adiabatic wall enthalpy, which deviates greatly from the flight condition.

SUMMARY

With respect to the requirement that the adiabatic wall enthalpy and the cold-wall heat flux are equal in the simulation test of the aerodynamic heating environment, the present invention proposes a method that can ensure the similarity of ground test parameters and flight parameters without the equal adiabatic wall enthalpy, provides a new parameter adjustment idea for the simulation test of the aerodynamic heating environment, widens the test simulation conditions, solves the problems of relying on the equal adiabatic wall enthalpy and making it difficult to accurately simulate the real aerodynamic heating environment in the current test simulation method, and provides guarantee for heat transfer and ablation test research of thermal protection/insulation material under the high temperature aerodynamic heating environment.

The technical solution of the present invention is:

A parameter similarity method for test simulation conditions of an aerodynamic heating environment comprises the following steps:

(1) assuming free stream temperature as $T_\yen$, free stream Mach number as $Ma_\yen$ and free stream heat capacity ratio of air as g at flight condition; calculating recovery temperature $$T_{r1} = T_\yen\left(1 + r\frac{g-1}{2}Ma_\yen^2\right)$$

of the free stream, wherein r is a temperature recovery coefficient which ranges from 0.88 to 0.92; calculating adiabatic wall enthalpy $h_{r1} = \int_0^{T_{r1}} c_p dT$ of the free stream, wherein c is specific heat capacity of air at constant pressure and T represents the temperature;

(2) calculating a convective heat transfer coefficient $a_1$ of the surface of a flight vehicle structure according to characteristics of the flight vehicle structure and an aerodynamic heating engineering algorithm; for a turbulent flow state of a flat surface, obtaining the convective heat transfer coefficient $$a_1=0.0296(Re_1^*)^{-1/2}(Pr_1^*)^{-2/3}(rv)_¥c_p,$$

wherein $Re^*_1$ is a Reynolds number of a free stream at reference temperature; $Pr^*_1$ is a Prandtl number of the free stream at reference temperature; $(rv)_¥$ is a momentum of the free stream; calculation equations of the convective heat transfer coefficients of other geometric structural surfaces are slightly different from this, and refer to a relevant aerodynamic heating engineering algorithm;

(3) calculating the cold-wall heat flux according to the convective heat transfer coefficient obtained in the step (2);

$$q_{01}=a_1(T_{r1}-T_0),$$

wherein $T_0$ is cold-wall temperature, $T_0$=300K; (4) calculating the wall surface temperature $T_{w1}$ of the material of the flight vehicle structure under the cold-wall heat flux determined in the step (3) by using a method of computational heat transfer;

(5) when the adiabatic wall enthalpy $h_{r2}$ of a gas flow of a test device is less than the adiabatic wall enthalpy $h_{r1}$ of the flight condition, assuming the total temperature of an initial gas flow as $T^*_2=T_{w1}+20K$ according to the geometry of the test device and the free stream condition, and calculating the convective heat transfer coefficient $\alpha_1$ on the surface of the test piece in the test by using a method of computational fluid dynamics;

(6) making the surface temperature of the test piece as $T_{w2}=T_{w1}$, and adjusting the recovery temperature of the gas flow in the test device according to the convective heat transfer coefficient $\alpha_2$ calculated in the step (5);

$$T_{r2} = \frac{a_1}{a_2}(T_{r1} - T_{w1}) + T_{w2}$$

calculating the total temperature $T^*_2=T_{r2}/r_2$ of the gas flow, wherein $r_2$ is a temperature recovery coefficient of the test condition; substituting $T^*_2$ into the step (5), repeating the calculation of step (5) to step (6), and conducting a next step until $T_{r2}$ and $a_2$ tend to be stable;

(7) determining the cold-wall heat flux of the test condition $$q_{02} = \frac{a_2(T_{r2} - T_{02})}{a_1(T_{r1} - T_{01})} q_{01}$$

The hot-wall heat flux $q_2=a_2(T_{r2}-T_{w2})$ based on the test simulation is equal to the hot-wall heat flux $q_1=a_1(T_{r1}-T_{w1})$ of the flight condition, and the convective heat transfer coefficient is assumed to be unchanged when the cold-wall heat flux is calculated, thereby obtaining the cold-wall heat flux determined in the step (7).

Test parameters determined according to the above steps are only the total gas temperature and the cold-wall heat flux, not including the adiabatic wall enthalpy. Because the convective heat transfer coefficient $a_2$ under the ground test condition is much larger than the convective heat transfer coefficient $a_1$ under the flight condition, the recovery temperature $T_{r2}$ under the test condition obtained in the step (6) is only slightly larger than the surface temperature $T_{w1}$. Because the total gas temperature of the test is $T^*_2=T_{r2}/r_2$ and the value range of $r_2$ is 0.88-0.92, the total gas temperature required for the test is also only slightly larger than $T_{w1}$.

For most materials, the maximum allowable temperature is generally less than 2200° C., so the total gas temperature may not exceed 3000° C., which can be satisfied by most test devices.

The present invention has the following effects and benefits: the test conditions are not affected by the value of the adiabatic wall enthalpy. According to the method, most test devices can simulate the aerodynamic heating environment with high enthalpy. The present invention provides a new parameter adjustment idea for high enthalpy wind tunnel tests and widens the test simulation conditions.

DETAILED DESCRIPTION

Specific embodiments of the present invention are described below in detail in combination with the technical solution.

Embodiment 1: an aerodynamic heating environment with high enthalpy value and low heat flux when a certain flight vehicle flies at a high altitude of 75 km and a Mach number of 10 Ma is simulated.

(1) An atmospheric parameter table is consulted to obtain the airflow temperature $T_¥$=208.399K at high altitude of 75 km and density of $\rho=3.992\times10^{-5}$ kg/m³. According to the Mach number $Ma_¥$=10, the heat capacity ratio g=1.4 of air and the temperature recovery coefficient r=0.89, the recovery temperature $$T_{r1} = T_¥\left(1 + r\frac{g-1}{2}Ma_¥^2\right) = 3667.8 \text{ K}$$

of the airflow is calculated, and the adiabatic wall enthalpy $h_{r1}=\int_0^{T_{r1}}c_p dT=3839$ kJ/kg of the airflow is calculated.

(2) The convective heat transfer coefficient of the surface of the flight vehicle structure under the flight condition is calculated $$a_1=0.0296(Re_1^*)^{-1/2}(Pr_1^*)^{-2/3}(rv)_¥c_p=2.8W/m^2\times K.$$

(3) The cold-wall heat flux $q_{01}=a_1(T_{r1}-T_0)$=9.69 kW/m² is calculated.

(4) The wall surface temperature $T_{w1}$=638K of the material of the flight vehicle structure is obtained through computational heat transfer.

(5) The total temperature of the gas flow is assumed as $T^*_2=T_{w1}+20K=658K$; and the convective heat transfer coefficient $\alpha_2$=50 W/m²·K on the surface of the test piece in the test is calculated by using a method of computational fluid dynamics.

(6) The surface temperature of the test piece is made as $T_{w2}$=638K and the temperature recovery coefficient under the test condition is made as $r_2$=0.9; and the recovery temperature of the test gas flow is adjusted according to the convective heat transfer coefficient $\alpha_2$.

$$T_{r2} = \frac{a_1}{a_2}(T_{r1} - T_{w1}) + T_{w2}.$$

The total temperature $T^*_2=T_{r2}/r_2$ of the airflow is calculated; $T^*_2$ is changed; and calculation of step (5) to step (6) is repeated until $T_{r2}$ and $a_2$ are stable; at this moment, $T_{r2}$=698.5K, $a_2$=60 W/m²×K, $T^*_2$=776.11K.

(7) The cold-wall heat flux of the test condition is determined $$q_{02} = \frac{a_2(T_{r2} - T_{02})}{a_1(T_{r1} - T_{01})} q_{01} = 65.14 \text{ kW/m}^2.$$

The invention claimed is:

1. A parameter similarity method for test simulation conditions of an aerodynamic heating environment, comprising the following steps:

(1) assuming temperature of a free stream as $T_¥$, free stream Mach number of the free stream as $Ma_¥$ and free stream heat capacity ratio of air as g at flight condition; calculating recovery temperature $$T_{r1} = T_¥\left(1 + r\frac{g-1}{2}Ma_¥^2\right)$$

of the free stream, wherein r is a temperature recovery coefficient which ranges from 0.88 to 0.92; calculating adiabatic wall enthalpy $h_{r1} = \int_0^{T_{r1}} c_p dT$ of the free stream wherein $c_p$ is specific heat capacity of air at constant pressure and T represents the temperature;

(2) calculating a first convective heat transfer coefficient $a_1$ of the surface of a flight vehicle structure according to characteristics of the flight vehicle structure and an aerodynamic heating engineering algorithm; for a turbulent flow state of a flat surface, obtaining the first convective heat transfer coefficient $$a_1 = 0.0296(Re_1^*)^{-1/2}(Pr_1^*)^{-2/3}(rv)_¥ c_p$$

wherein $Re_1^*$ is a Reynolds number of a free stream at reference temperature; $Pr_1^*$ is a Prandtl number of the free stream at reference temperature; $(rv)_¥$ is a momentum of the free stream; calculation equations of the first convective heat transfer coefficients of other geometric structural surfaces are slightly different from this, and refer to a relevant aerodynamic heating engineering algorithm;

(3) calculating a cold-wall heat flux according to the first convective heat transfer coefficient obtained in the step (2);

$$q_{01} = a_1(T_{r1} - T_0),$$

wherein $T_0$ is cold-wall temperature, $T_0 = 300K$;

(4) calculating a wall surface temperature $T_{w1}$ of the material of the flight vehicle structure under the cold-wall heat flux determined in the step (3) by using a method of computational heat transfer;

(5) when an adiabatic wall enthalpy $h_{r2}$ of a gas flow of a test device is less than the adiabatic wall enthalpy $h_{r1}$ of the free stream, assuming a first total temperature of an initial gas flow as $T_2^* = T_{w1} + 20K$ according to the geometry of the test device and the free stream condition, and calculating a second convective heat transfer coefficient $\alpha_2$ on the surface of a test piece in the test by using a method of computational fluid dynamics;

(6) making the surface temperature of the test piece as $T_{w2} = T_{w1}$, and adjusting the recovery temperature of the gas flow in the test device according to the second convective heat transfer coefficient $\alpha_2$ calculated in the step (5);

$$T_{r2} = \frac{a_1}{a_2}(T_{r1} - T_{w1}) + T_{w2}$$

calculating a second total temperature $T_2^* = T_{r2}/r_2$ of the gas flow, wherein $r_2$ is a temperature recovery coefficient of the test condition; substituting $T_2^*$ into the step (5), repeating the calculation of step (5) to step (6), and conducting a next step until $T_{r2}$ and $a_2$ tend to be stable;

(7) determining the cold-wall heat flux of the test condition $$q_{02} = \frac{a_2(T_{r2} - T_0)}{a_1(T_{r1} - T_0)} q_{01}.$$

* * * * *